(12) United States Patent
Lee et al.

(10) Patent No.: US 8,798,124 B2
(45) Date of Patent: Aug. 5, 2014

(54) METHOD OF MEASURING ERROR VECTOR MAGNITUDE

(75) Inventors: Sung Jun Lee, Daejeon (KR); Young-Hoon Kim, Daejeon (KR); Jae Ho Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 20 days.

(21) Appl. No.: 13/614,130

(22) Filed: Sep. 13, 2012

(65) Prior Publication Data
US 2013/0142236 A1 Jun. 6, 2013

(30) Foreign Application Priority Data
Dec. 2, 2011 (KR) ........................ 10-2011-0128295

(51) Int. Cl.
*H04B 3/46* (2006.01)
*H04B 17/00* (2006.01)
*H04Q 1/20* (2006.01)

(52) U.S. Cl.
USPC ........................................ 375/224; 324/76.11

(58) Field of Classification Search
USPC .................. 375/224, 226, 377; 324/76.11
See application file for complete search history.

(56) References Cited

U.S. PATENT DOCUMENTS

| 2004/0114675 | A1* | 6/2004 | Crawford ....................... 375/149 |
| 2007/0087700 | A1* | 4/2007 | Tanida ........................... 455/101 |
| 2008/0069195 | A1* | 3/2008 | Amos ............................ 375/228 |
| 2009/0175181 | A1* | 7/2009 | Kim et al. ..................... 370/252 |
| 2011/0286502 | A1* | 11/2011 | Adachi et al. ................. 375/219 |
| 2012/0020240 | A1* | 1/2012 | Miura ........................... 370/252 |

FOREIGN PATENT DOCUMENTS

KR 1020090052149 5/2009

* cited by examiner

*Primary Examiner* — Jean B Corrielus
(74) *Attorney, Agent, or Firm* — Nelson Mullins Riley & Scarborough LLP; Anthony A. Laurentano, Esq.; Lewis Lee, Esq.

(57) ABSTRACT

A method of checking an error vector magnitude of transmitter in accordance with some embodiments of the inventive concept may include dividing a transmission baseband signal which the transmitter transmits into a plurality of processing units; performing a transmitter function and an ideal receiver function with respect to each of the plurality of processing units; generating a reception baseband signal by recombining a processing result of each of the plurality of processing units; and calculating an error vector magnitude (EVM) by comparing the transmission baseband signal with the reception baseband signal. A simplified method of checking an error vector magnitude of transmitter in accordance with some embodiments of the inventive concept may include generating symbols composed of only pilots; generating symbol composed of only data; and checking an error vector magnitude (EVM) using the all the symbols.

4 Claims, 6 Drawing Sheets

METHOD OF MEASURING ERROR VECTOR MAGNITUDE

CROSS-REFERENCE TO RELATED APPLICATIONS

This U.S. non-provisional patent application claims priority under 35 U.S.C. §119 of Korean Patent Application No. 10-2011-0128295, filed on Dec. 2, 2011, the entire contents of which are hereby incorporated by reference.

BACKGROUND

The present inventive concept herein relates to mobile communication devices, and more particularly, to a method of checking an error vector magnitude of transmission signal.

In standards such as IEEE 802.16 or 3GPP LTE ($3^{rd}$ generation partnership project long term evolution), a radio transmission or reception specification which a transmitter and receiver should satisfy is defined. A transmission specification may be divided into an intended transmission requirement and an unwanted emission requirement. The intended transmission requirement means a specification about an intended transmission and describes an output power and a quality feature of transmission signal. The unwanted emission requirement means a specification about unwanted signal emission. The unwanted emission requirement describes a specification of an adjacent channel leakage ratio (ACLR), an operating band unwanted emission and a spurious emission. The transmission signal quality can be expressed through a performance index such as an error vector magnitude (EVM).

An EVM check through a simulation before an implementation may be required for rapidly changing communication technology and newly appearing standard. In some cases, it may be impossible to check EVM using the current method.

SUMMARY

Embodiments of the inventive concept provide a method of checking an error vector magnitude (EVM) of transmitter. The method may include dividing a transmission baseband signal which the transmitter transmits into a plurality of processing units; performing a transmitter function and an ideal receiver function with respect to each of the plurality of processing units; generating a reception baseband signal by recombining a processing result of each of the plurality of processing units; and calculating an error vector magnitude (EVM) by comparing the transmission baseband signal with the reception baseband signal.

Embodiments of the inventive concept also provide a simplified method of checking an error vector magnitude (EVM). The method may include generating symbols composed of only pilots; generating symbol composed of only data; and checking an error vector magnitude (EVM) using the all the symbols.

BRIEF DESCRIPTION OF THE FIGURES

Preferred embodiments of the inventive concept will be described below in more detail with reference to the accompanying drawings. The embodiments of the inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

DETAILED DESCRIPTION OF THE EMBODIMENTS

Embodiments of inventive concepts will be described more fully hereinafter with reference to the accompanying drawings, in which embodiments of the invention are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

Figure 1:
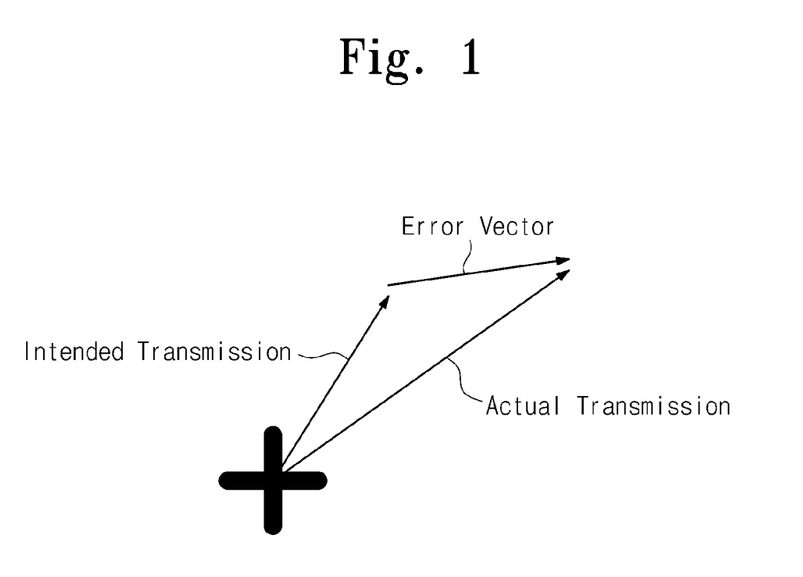
FIG. 1 is a drawing illustrating a definition of error vector magnitude (EVM).

FIG. 1 is a drawing illustrating a definition of error vector magnitude (EVM). Referring to FIG. 1, a difference exists between an intended transmission signal and an actually transmitted signal. The difference may be expressed by an error vector magnitude.

The error vector is caused because a transmitting system is not ideal in practice. Thus, the EVM is used as a performance index expressing signal quality degradation caused by a transmitting system performance. Satisfying a specification of EVM means that a transmitting system is embodied above a level that can use the standard, in which the above specification is stated. The EVM is generally not a performance index measured during an operation of communication system. The EVM is a performance index for checking performance of transmitting system using a known signal before operating a designed communication system.

A non ideal characteristic of transmitting system is mostly generated in a RF (radio frequency) stage. Characteristics such as nonlinearity or phase noise generated in RF stage are related to performance of transmitter. Thus, a standard performance index is considered to be associated with a traditional RF performance index such as IP3 (3'rd order intercept point). The traditional RF performance index is a value defined with respect to one tone input signal or two tone input signal.

In the case that an experience for realizing the same standard or the same structure is accumulated, a traditional performance index of RF stage and a performance index of the standard are easily associated with each other. Thus, when designing an RF stage, a new system can be designed on the basis of the traditional performance index of RF stage. That is, a design can be performed on the basis of a simulation using one tone signal or two tone signal as an input.

However, when there is not an implementation experience like a structure based on a new concept or a new theory, a link between a traditional performance index of RF stage and a performance index of new standard is not clear. Therefore, a design should be performed on the basis of a simulation using a modulation signal defined in the standard as an input. Moreover, even when there is an implementation experience, a finally system should satisfy a specification described in the standard. Thus, if it could be checked whether or not the system satisfies a specification required in the standard before realizing a designed transmitting system, a cost increases due to trial and error can be reduced. Finally, a transmitting system is embodied and it is checked whether satisfies the described specification.

In a RF stage or a component constituting the RF stage, there is a case that a time domain simulation with respect to a modulation signal of RF band is needed for a simulation using a modulation signal defined in the standard as an input. A transmission structure using a Class-S power amplifier which is a candidate of next generation transmission technology corresponds to the case described above. In this case, in a time domain simulation, a very short simulation time step may be required as compared with a total simulation time for checking an error vector magnitude (EVM). And, this may lead to a memory shortage of computer in the simulation for an error vector magnitude (EVM) check. Or, in any standard that will exist in the future, it may be difficult to measures a transmission signal at a time for a check of error vector magnitude (EVM). The inventive concept may provide a method of easily checking an error vector magnitude (EVM) even when it is difficult to obtain signal for an error vector magnitude (EVM) check at a time.

Figure 2:
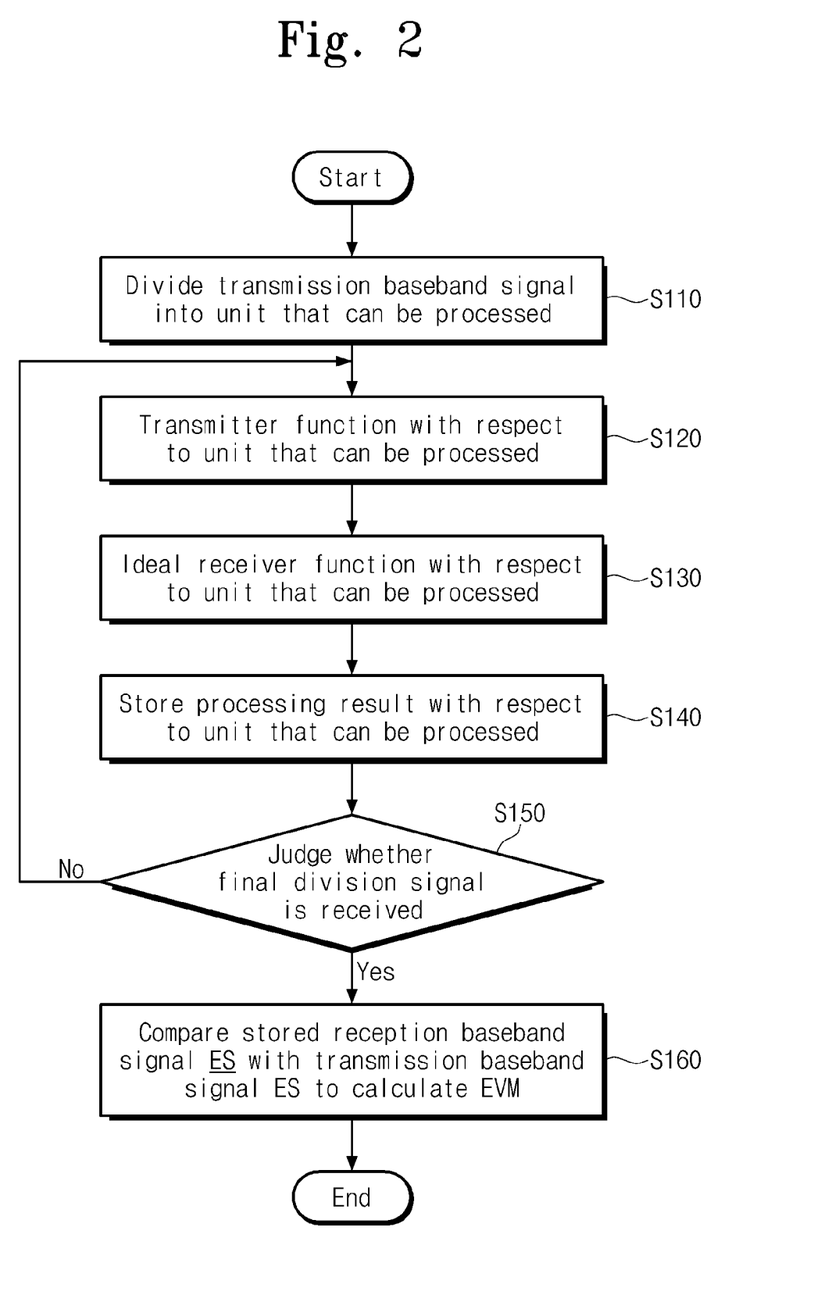
FIG. 2 is a flow chart illustrating a method of checking an error vector magnitude (EVM) through a signal division processing according to the inventive concept.

FIG. 2 is a flow chart illustrating a method of checking an error vector magnitude (EVM) through a signal division processing according to the inventive concept. According to the method in accordance with an embodiment of the inventive concept illustrated in FIG. 2, a signal which is for check of error vector magnitude (EVM) is divided into a length that can be processed and after that, the divided signal are processed and recombined. It will be described below.

In S110, a signal that is for an error vector magnitude (EVM) is divided into a unit that can be processed. As an example, an OFDM down link signal of 20 MHz bandwidth will be considered. A parameter related to the down link signal is tabulated in table 1 below.

TABLE 1

| Baseband sample rate | FFT size | EVM checking unit |
|---|---|---|
| 30.72 MHz | 2048 | 14 OFDM symbols (=30720 time samples = 1 ms) |

In a case of simulation, output length is same to a length of given input signal. Thus, if accurately 14 OFDM symbols are input, due to a delay that occurs in the process of emulating a designed transmitter and an ideal receiver, a length of output signal after a synchronization time is not the 14 OFDM symbols. The problem can be solved by adding an input signal of length corresponding to an extra time ($\alpha$) for a simulation. In a real measurement, even though a length of input signal is accurately the 14 OFDM symbols, it is possible that a time of (1 ms+$\alpha$) will be measured.

There may be a situation that a signal of length corresponding to the measuring time (1 ms+$\alpha$) is processed at a time and the outcome of this process cannot be obtained. For example, a simulation situation for checking an error vector magnitude (EVM) in a Class-S transmitting structure which is a candidate of next generation transmission technology corresponds to the case described above. In a simulation, to check an error vector magnitude (EVM) of a Class-S structure, a time domain simulation with respect to a modulation signal of RF band is needed. If a time interval is 5 ps which is required so that a time domain simulation with respect to an RF signal of 1 GHz carrier frequency converges, samples of 200,000,000 or more are needed to express all the lengths corresponding to the time (1 ms+$\alpha$). It may be impossible to obtain this due to a memory shortage depending on a simulation computer and a simulation tool. To solve the problem, a signal for checking an error vector magnitude (EVM) is divided into a plurality of units (for example, symbol unit) that can be processed.

In S120, each of that signals divided into units that can be processed passes a designed transmitter function. The transmitter function may be a simulation with respect to a transmitter or may be a real transmitter.

In S130, a transmission signal passes an ideal receiver function. The receiver function may be a simulation with respect to an ideal receiver or may be a high performance measuring instrument.

In S140, an error vector magnitude (EVM) cannot be obtained by only one received division signal. Thus, the received division signal will be stored in any storage place.

In S150, it is judged whether a transmission/reception simulation with respect to all the signals for checking an error vector magnitude (EVM) is completed. When it is assumed that a division signal is sequentially transmitted, it is judged whether the final division signal is received. If it is determined that the final division signal is received, a procedure finally moves to S160 for calculating an error vector magnitude (EVM). If it is determined that the final division signal is not received, a procedure moves to the S120 for performing a transmission/reception function on remaining division signals.

In S160, a calculation of error vector magnitude (EVM) is performed through a comparison operation of original baseband symbols and stored baseband symbols. A difference between an intended transmission signal and a signal actually transmitted can be calculated.

Figure 3:
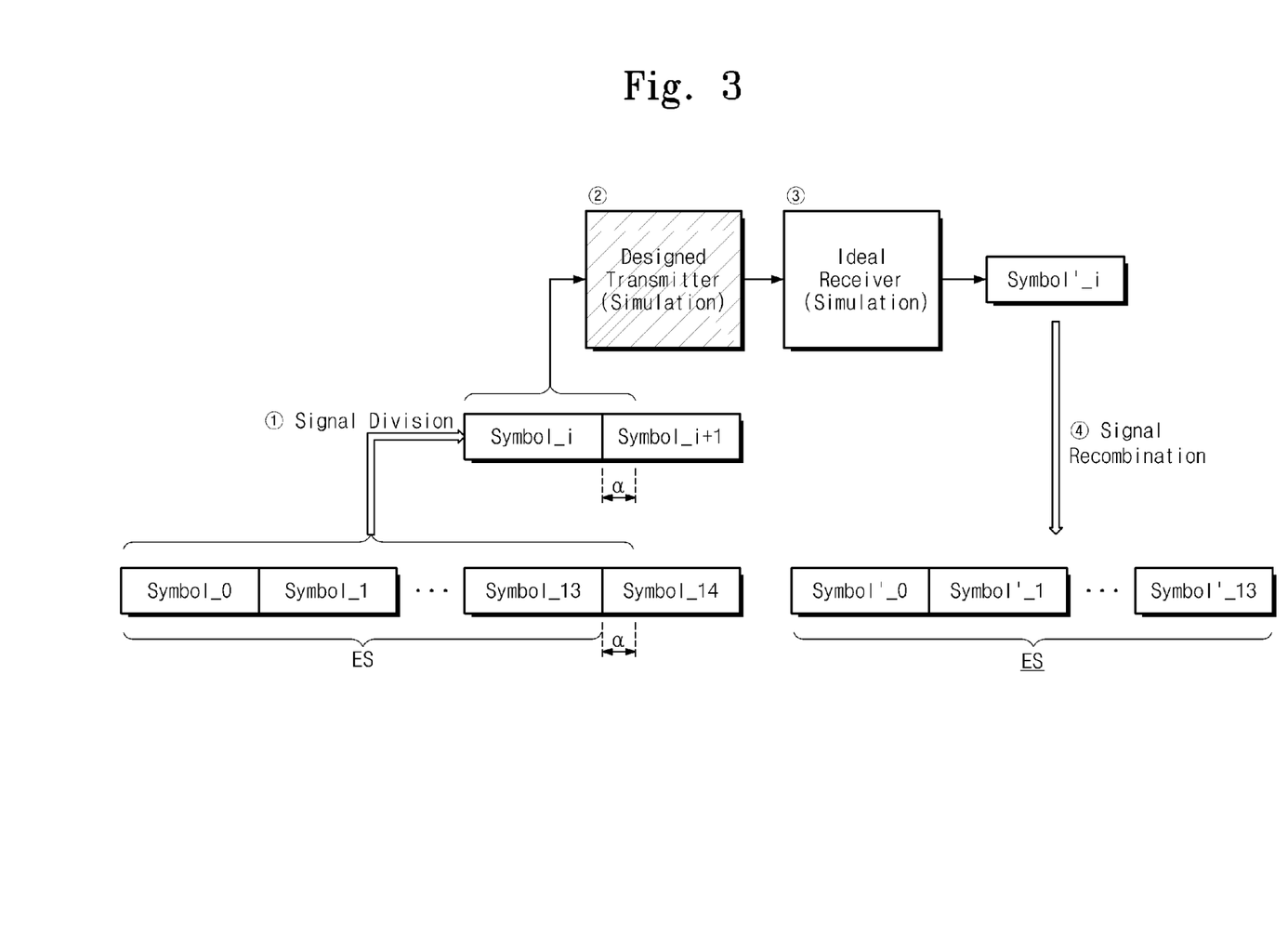
FIG. 3 is a block diagram illustrating an embodiment that a method of finding a performance index of FIG. 2 is applied to a simulation.

FIG. 3 is a block diagram illustrating an embodiment that a method of finding a performance index of FIG. 2 is applied to a simulation. Referring to FIG. 3, a transmission baseband signal ES for checking an error vector magnitude (EVM) is composed of a plurality of symbols Symbol_0~Symbol_13. To perform a simulation for checking an error vector magnitude (EVM), the transmission baseband signal ES may be divided into a plurality of units that can be processed. This procedure is expressed by a quotation mark ①. The transmission baseband signal ES may be divided by a symbol unit or by a unit of two or more symbols. The symbol Symbol_14 corresponds to a dummy symbol added to compensate a delay generated while emulating a designed transmitter and an ideal receiver.

When setting a division unit that can be processed through one transmission/reception simulation as one symbol, an input signal is actually like FIG. 3. A transmitter simulation is performed on each unit. This procedure is illustrated by a quotation mark ②.

An ideal receiver simulation is performed on a transmission signal. This procedure is expressed by a quotation mark ③.

If a transmission/reception simulation with respect to the symbols Symbol_0~Symbol_13 included in the transmission baseband signal ES is completed, a constitution of reception baseband signal ES is possible. A recombination procedure to the reception baseband signal ES is expressed by a quotation mark ④. Thus, an error vector magnitude (EVM) of designed transmitter can be checked by calculating a difference between the transmission baseband signal ES and the reception baseband signal ES.

Figure 4:
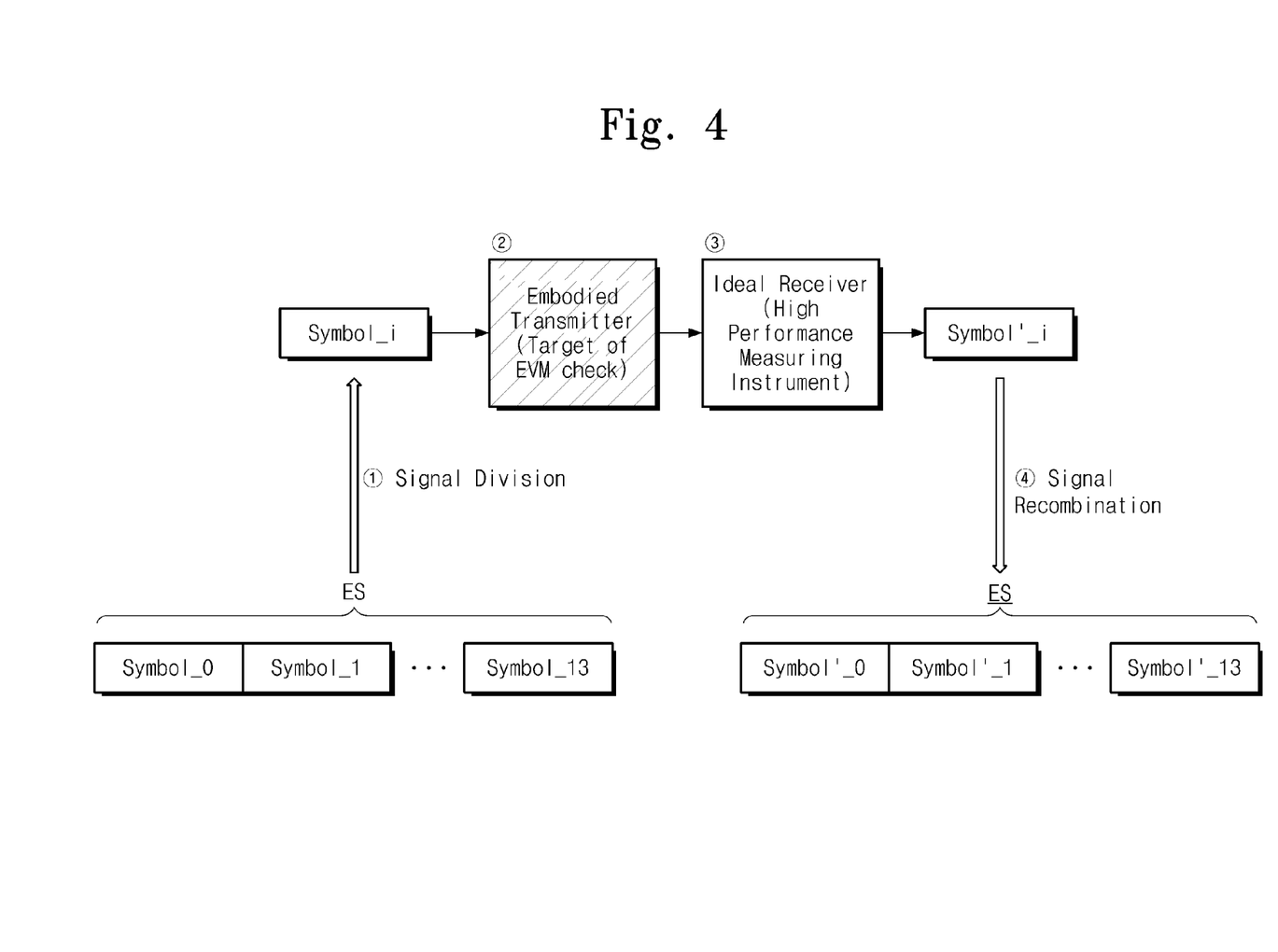
FIG. 4 is a block diagram illustrating an embodiment of a transmitter in which a method of finding a performance index of FIG. 2 is applied.

FIG. 4 is a block diagram illustrating an embodiment of a transmitter in which a method of finding a performance index of FIG. 2 is applied.

Referring to FIG. 4, a transmission baseband signal ES for checking an error vector magnitude (EVM) is composed of a plurality of symbols Symbol_0~Symbol_13. To check an error vector magnitude (EVM) with respect to an actually embodied transmitter, the transmission baseband signal ES may be divided into a plurality of units that can be processed. This procedure is expressed by a quotation mark ①. The transmission baseband signal ES for checking an error vector magnitude (EVM) may be divided by a symbol unit or by a unit of two or more symbols.

A baseband symbol input which is a division unit (for example, symbol unit) that can be processed is input to the actually embodied transmitter. The transmitter outputs a transmission signal. This procedure is expressed by a quotation mark ②.

A measurement is performed by a high performance measuring instrument emulating an ideal receiver with respect to a transmission signal. This procedure is expressed by a quotation mark ③.

If a division reception for measuring an error vector magnitude (EVM) is completed, a reception baseband signal ES is generated by recombining the division reception. A recombination procedure to the reception baseband signal ES is expressed by a quotation mark ④.

Thus, an error vector magnitude (EVM) of designed transmitter can be checked by calculating a difference between the transmission baseband signal ES and the reception baseband signal ES.

As a communication technology is changed, there may be a case that it is difficult to obtain signal for an error vector magnitude (EVM) check at a time. In this case, by the method described above, a transmission baseband signal is divided into a unit that can be processed at a time in a transmitter and a measuring instrument, processed, and a reception baseband signal ES can be constituted by combining a measured processing unit. Thus, the inventive concept can be applied to measure a performance index of the embodied transmitter when an error vector magnitude cannot be measured.

Figure 5:
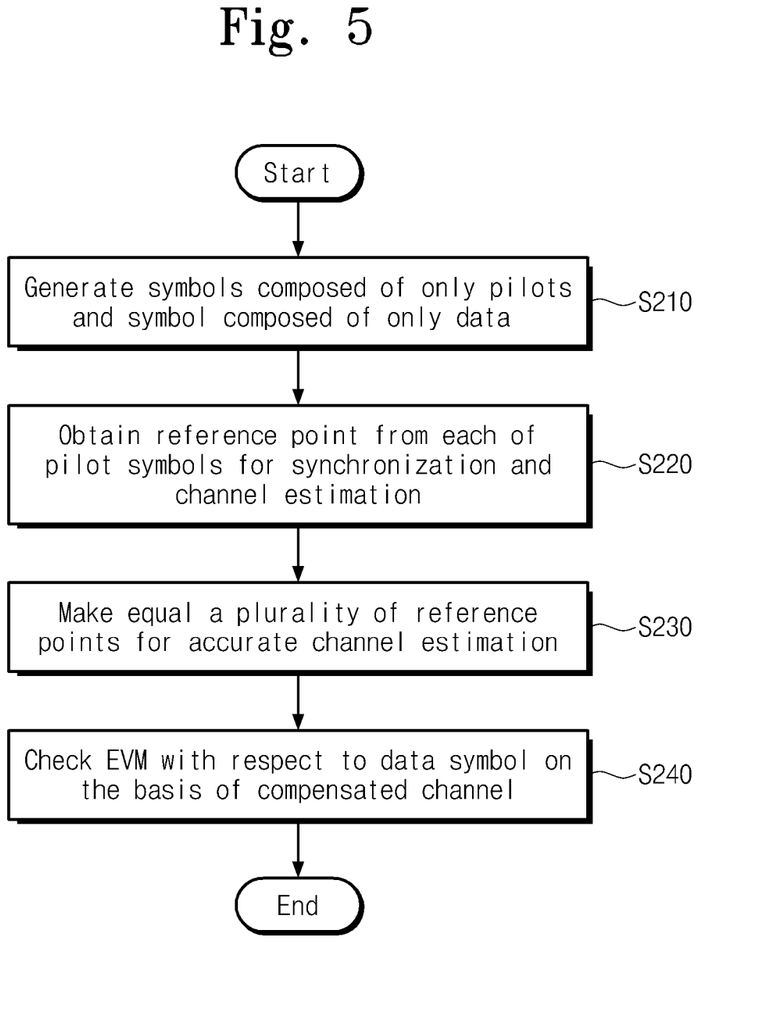
FIG. 5 is a flow chart illustrating a process of generating a simplified error vector magnitude (EVM) check signal according to the inventive concept.

FIG. 5 is a flow chart illustrating a process of generating a simplified error vector magnitude (EVM) check signal according to the inventive concept.

In S210, pilots and data spread across a transmission baseband signal are gathered to generate symbols Symbol P1, P2 and P3 composed of only pilots and symbol Symbol D1 composed of only data. Details related to this are as below. Obtaining a signal of length corresponding to 10 sub-frames is needed to check an error vector magnitude (EVM) in accordance with an LTE standard. And, 14 symbols Symbol_0~Symbol_13 constituting the transmission baseband signal ES illustrated in FIG. 3 correspond to one sub-frame of LTE signal. Thus, if a length of signal that can be processed at a time is one OFDM symbol, 140 handlings are needed to check an error vector magnitude (EVM) in accordance with a standard. In the case that a transmission baseband signal is divided to be processed, 140 reception baseband symbols should be recombined which are generated by sequentially processing the 140 OFDM symbols one by one.

In this case, a division of the transmission baseband signal ES, repetitive processing, and recombination with respect to the divided signal may cause a lot of troublesome and cost increase. Thus, there may have difficulties when checking an error vector magnitude (EVM) using that method.

The reason why 10 sub-frames are required to check an error vector magnitude (EVM) in a LTE standard is to test error vector magnitude (EVM) accurately. That is, it is for check of only the degradation due to non ideal transmitter characteristic. The reason why in the LTE standard, a checking unit of error vector magnitude (EVM) is one sub-frame is that pilots are evenly distributed in the 14 OFDM symbols.

Thus, in another embodiment of the inventive concept, a transmission baseband symbol not evenly distributing pilots in OFDM symbols but concentrating pilots on a specific symbol is constituted. By concentrating pilots, synchronization and channel estimation are possible only by one OFDM symbol. In this case, a minimum transmission baseband symbols required to check an error vector magnitude (EVM) is two symbols. The two symbols are a pilot symbol for synchronization and channel estimation and a data symbol for measuring an error vector magnitude (EVM). However, to increase an accuracy of channel estimation, a plurality of pilot symbols may be needed. In the present embodiment, it will be describe through an example of three symbols P1, P2 and P3. However, the number of pilot symbols may be variously set.

In S220, pilot symbols P1, P2 and P3 and data symbol D1 constituting a transmission baseband symbol are received. Synchronization is set and channel estimation is made using the pilot symbols P1, P2 and P3. Channel estimated from each of the pilot symbols P1, P2 and P3 may have a deviation. Reference points are generated which correspond to each of the pilot symbols P1, P2 and P3.

In S230, an arithmetic operation to obtain an accurate reference point from a plurality of reference points may be performed. For example, an average location of reference points generated from each of the pilot symbols P1, P2 and P3 may be provided as a final reference point.

In S240, a reception value with reference to data symbol D1 is determined with reference to the final reference point and an error vector magnitude (EVM) is calculated with reference to the determined data.

To check an error vector magnitude (EVM), a method of constituting a simplified transmission baseband symbol was described. That is, it is possible that a transmission baseband signal is constituted so that at least one pilot symbol and at least one data symbol are included in the transmission baseband signal to check an error vector magnitude (EVM). The pilot symbol is a symbol concentrating a pilot for synchronization and channel estimation and the data symbol becomes a target for actually measuring an error vector magnitude (EVM). Reduction of time and cost is expected according to a constitution of simplified transmission baseband signal and a method of checking an error vector magnitude (EVM) by that constitution.

Figure 6:
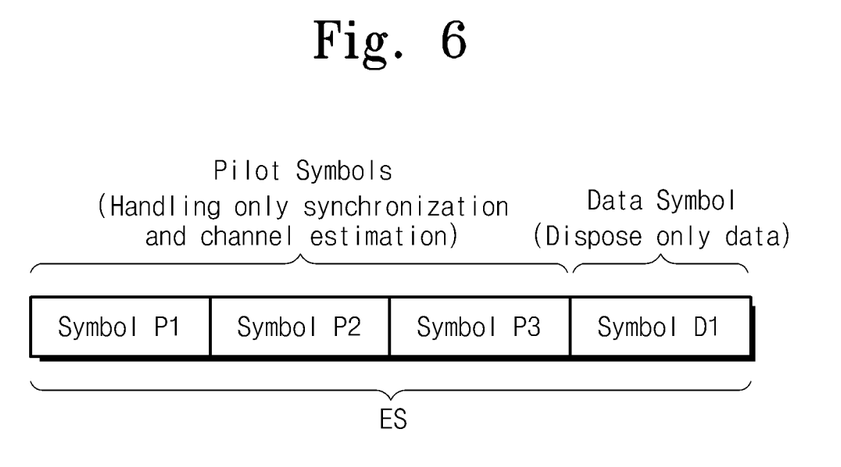
FIG. 6 is a drawing illustrating an example of a transmission baseband signal ES constituted for a check of error vector magnitude (EVM) according to an embodiment of FIG. 5.

FIG. 6 is a drawing illustrating an example of a transmission baseband signal ES constituted for a check of error vector magnitude (EVM) according to an embodiment of FIG. 5. Referring to FIG. 6, the transmission baseband signal ES includes the pilot symbols P1, P2 and P3 and the data symbol D1.

The pilot symbols P1, P2 and P3 are constituted by only pilots for synchronization and channel estimation. The number of pilot symbols may increase within an optimum level in the receiver to increase accuracy of channel estimation. The pilot symbols P1, P2 and P3 for synchronization and channel estimation may be constituted so that they include pilots in every possible sub-carrier. Since the error vector magnitude (EVM) is a performance index checking only signal quality degradation due to a transmitting system, those settings above may have a meaning. The data symbol D1 is a symbol constituted to check the error vector magnitude (EVM) with reference to a reference point generated from the pilot symbols P1, P2 and P3.

The number of pilot symbols should be determined to reduce a length of transmission signal to measure the error vector magnitude (EVM) and to guarantee an accuracy of the error vector magnitude (EVM) check simultaneously.

An OFDM signal of bandwidth of 20 MHz according to an LTE standard uses 1200 subcarriers among 2048 subcarriers. Among the 1200 subcarriers, not every subcarrier corresponds to a pilot. That is, even though gathering all the pilots included here and there in one sub-frame, the pilots correspond to a portion of the 1200 subcarriers and channel estimation with respect to the rest of 1200 subcarriers is performed through an interpolation. In the method suggested by the inventive concept, since a pilot symbol handling only synchronization and channel estimation is separated, pilots are added with respect to all the possible subcarriers to increase accuracy of channel estimation.

According to some embodiments of the inventive concept, since a performance index of transmitter such as an error vector magnitude (EVM) can be simply measured or checked through a simulation with respect to various standards, time and cost required to design a transmitting system are expected to be reduced.

The foregoing is illustrative of the inventive concept and is not to be construed as limiting thereof. Although a few embodiments of the inventive concept have been described, those skilled in the art will readily appreciate that many modifications are possible in the embodiments without materially departing from the novel teachings and advantages of the present invention. Accordingly, all such modifications are intended to be included within the scope of the present invention as defined in the claims. The present invention is defined by the following claims, with equivalents of the claims to be included therein

What is claimed is:

1. A method for calculating an error vector magnitude (EVM) of a transmitter comprising:
    dividing a transmission baseband signal which the transmitter transmits into a plurality of processing units;
    performing a transmitter function and an ideal receiver function on each of the plurality of processing units;
    generating a reception baseband signal by recombining a processing result of each of the plurality of processing units performed in the performing step; and
    calculating the error vector magnitude (EVM) by comparing the transmission baseband signal with the reception baseband signal.

2. The method of claim 1, wherein the transmitter function is performed by a simulation with respect to the transmitter and wherein the receiver function is performed by a simulation or a high performance measuring instrument.

3. The method of claim 1, wherein a signal corresponding to a specific time length is added to each of the plurality of processing units to compensate a delay occurring while performing the transmitter function and the ideal receiver function.

4. The method of claim 3, wherein the plurality of processing units is constituted by at least one symbol and the adding signal is a part of a subsequent symbol of a symbol currently being processed.

* * * * *